(12) United States Patent
Lewis et al.

(10) Patent No.: US 10,245,807 B2
(45) Date of Patent: Apr. 2, 2019

(54) PANEL FOR ABSORBING MECHANICAL IMPACT ENERGY AND METHOD OF MANUFACTURING

(71) Applicant: University of Massachusetts, Boston, MA (US)

(72) Inventors: Armand F. Lewis, Mattapoisett, MA (US); Yong K. Kim, North Dartmouth, MA (US)

(73) Assignee: University of Massachusetts, Boston, MA (US)

(*) Notice: Subject to any disclaimer, the term of this patent is extended or adjusted under 35 U.S.C. 154(b) by 239 days.

(21) Appl. No.: 15/252,645

(22) Filed: Aug. 31, 2016

(65) Prior Publication Data

US 2016/0368240 A1 Dec. 22, 2016

Related U.S. Application Data

(63) Continuation of application No. 13/906,901, filed on May 31, 2013, now Pat. No. 9,440,413.

(Continued)

(51) Int. Cl.
*A41D 13/05* (2006.01)
*B32B 5/02* (2006.01)

(Continued)

(52) U.S. Cl.
CPC .............. *B32B 5/02* (2013.01); *A41D 13/015* (2013.01); *A42B 3/125* (2013.01); *A63B 71/10* (2013.01); *B32B 3/266* (2013.01); *B32B 5/12* (2013.01); *B32B 2262/0261* (2013.01); *B32B 2262/0284* (2013.01); *B32B 2307/56* (2013.01); *Y10T 428/23943* (2015.04)

(58) Field of Classification Search
None
See application file for complete search history.

(56) References Cited

U.S. PATENT DOCUMENTS 2,019,186 A  10/1935 Kaiser
2,187,140 A   1/1940 Farish et al.
(Continued)

FOREIGN PATENT DOCUMENTS

KR    1020080003406 A    1/2008
WO      2004012933 A1    2/2004
(Continued)

OTHER PUBLICATIONS

Brady, S., et al., "Wearable Sensors? What is There to Sense?", Studies in Health and Informatics, 117:80-88 (2005).

(Continued)

*Primary Examiner* — Arti Singh-Pandey
(74) *Attorney, Agent, or Firm* — Armis IP Law, LLC

(57) ABSTRACT

A panel for absorbing mechanical impact energy includes a substrate and a multiplicity of fibers attached, by one of their ends, to the substrate with their other ends extending away from the substrate. The panel may include a thin, porous covering layer that overlies the free ends of the fibers. The porosity of the cover and the fiber density of the fibers may allow for breathability of the panel. The panels may be flexible and may be used in body protection devices such as helmets, body armor as well as in other environments. Panels may be configured in a variety of energy absorbing arrangements for differing applications.

20 Claims, 9 Drawing Sheets

Related U.S. Application Data

(60) Provisional application No. 61/644,056, filed on Jun. 1, 2012.

(51) Int. Cl.
  *B32B 5/12* (2006.01)
  *A41D 13/015* (2006.01)
  *A42B 3/12* (2006.01)
  *A63B 71/10* (2006.01)
  *B32B 3/26* (2006.01)

(56) References Cited

U.S. PATENT DOCUMENTS

| | | |
|---|---|---|
| 2,303,203 A | 11/1942 | Farish et al. |
| 2,317,595 A | 4/1943 | Farish |
| 2,425,235 A | 8/1947 | Ferrante |
| 2,425,236 A | 8/1947 | Ferrante |
| 2,478,097 A | 8/1949 | Glanzer |
| 2,945,557 A | 7/1960 | Powers |
| 2,999,763 A | 9/1961 | Sommer |
| 3,018,845 A | 1/1962 | Powers |
| 3,215,584 A | 11/1965 | McConnell et al. |
| 3,496,054 A | 2/1970 | Baigas, Jr. |
| 3,583,890 A | 6/1971 | Klockmann |
| 3,772,132 A | 11/1973 | Dulin, Jr. |
| 3,815,341 A | 6/1974 | Hamano |
| 3,828,934 A | 8/1974 | Green et al. |
| 3,860,469 A | 1/1975 | Gregorian et al. |
| 3,961,115 A | 6/1976 | Klein |
| 3,961,116 A | 6/1976 | Klein |
| 4,016,317 A | 4/1977 | Kalwaites |
| 4,078,106 A | 3/1978 | Lind |
| 4,092,246 A | 5/1978 | Kummer |
| 4,246,308 A | 1/1981 | Walsh |
| 4,297,404 A | 10/1981 | Nguyen |
| 4,461,791 A | 6/1984 | Matsui et al. |
| 4,622,253 A | 11/1986 | Levy |
| 4,636,417 A | 1/1987 | Rasmussen |
| 4,699,818 A | 10/1987 | Evans et al. |
| 4,758,453 A | 7/1988 | Challet et al. |
| 4,847,133 A | 7/1989 | Foxman |
| 4,908,128 A | 3/1990 | Chiba |
| 5,047,103 A | 9/1991 | Abrams et al. |
| 5,219,469 A | 6/1993 | Binzer et al. |
| 5,389,247 A | 2/1995 | Woodside |
| 5,543,194 A | 8/1996 | Rudy |
| 5,985,148 A | 11/1999 | Liu |
| 6,060,145 A | 5/2000 | Smith et al. |
| 6,103,641 A | 8/2000 | Ghering, Jr. |
| 6,159,372 A | 12/2000 | Yang |
| 6,602,407 B2 | 8/2003 | Talbot et al. |
| 6,692,811 B1 | 2/2004 | Lasko |
| 8,533,869 B1 | 9/2013 | Capuano |
| 8,850,692 B2 | 10/2014 | Han |
| 9,321,218 B2 | 10/2016 | Han |
| 2001/0008039 A1 | 7/2001 | Alboom et al. |
| 2002/0023871 A1 | 2/2002 | Talbot et al. |
| 2004/0137190 A1 | 7/2004 | Lasko |
| 2004/0171321 A1 | 9/2004 | Plant |
| 2005/0014437 A1 | 1/2005 | Yoshida |
| 2006/0228967 A1 | 10/2006 | Gladfelter |
| 2007/0289688 A1 | 12/2007 | Abrams |
| 2008/0193709 A1 | 8/2008 | Han |
| 2008/0274326 A1 | 11/2008 | Kim et al. |
| 2009/0035599 A1 | 2/2009 | Kim et al. |
| 2010/0028552 A1 | 2/2010 | Stieber |
| 2011/0209595 A1 | 9/2011 | Han |
| 2012/0177861 A1 | 7/2012 | Eleazer et al. |
| 2012/0186002 A1 | 7/2012 | Bhatnagar et al. |
| 2013/0115408 A1 | 5/2013 | Abrams |
| 2013/0122256 A1 | 5/2013 | Kleiven et al. |
| 2013/0298317 A1 | 11/2013 | Fonte et al. |
| 2016/0243787 A1 | 8/2016 | Han |

FOREIGN PATENT DOCUMENTS

| | | |
|---|---|---|
| WO | 2012087406 A2 | 6/2012 |
| WO | 2015084709 A1 | 6/2015 |

OTHER PUBLICATIONS

Dunne, L.E., et al., "Initial Development and Testing of a Novel Foam-Based Pressure Sensor for Wearable Sensing", Journal of NeuoEngineering and Rehabilitation, 2(4): 7 pages, (2005).

Liu, Y., et al., "Compression Behavior of Warp-Knitted Spacer Fabrics for Cushioning Applications", Textile Research Journal, 11 pages, Aug. 2, 2011, downloaded from URL:http://trj.sagepub.com/content/early/2011/07/31/0040517511416283.

Qiao, P., et al., "Impact Mechanics and High-Energy Absorbing Materials: Review", Journal of Aerospace Engineering, 21(4):235-248 (2008).

Torg, MD, J.S., et al., "Retrospective Report on the Effectiveness of a Polyurethane Football Helmet Cover on the Repeated Occurrence of Cerebral Concussioins", The American Journal of Orthopedics, 28(2):128-132 (1999).

Notification of Transmittal of the International Search Report and the Written Opinion of the International Searching Authority for PCT/US2014/067883, "Flexible, Fibrous Energy Managing Composite Panels", dated Mar. 31, 2015.

Notification of Transmittal of the International Search Report and the Written Opinion of the International Searching Authority for PCT/US2016/020341, "Structured Flock Fiber Reinforced Layer", dated Jul. 25, 2016.

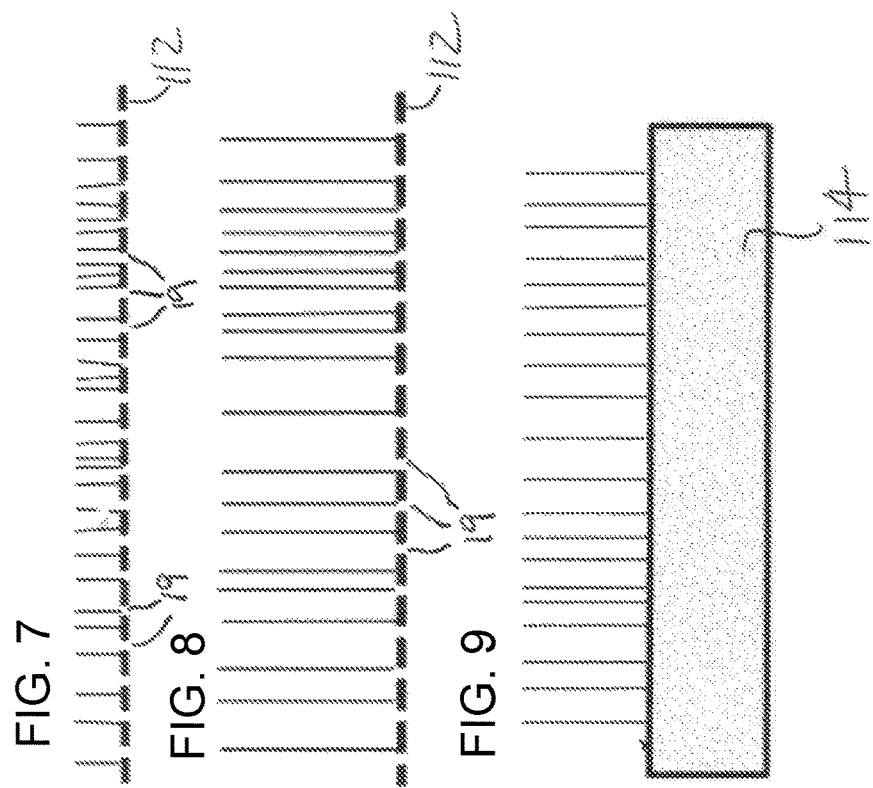
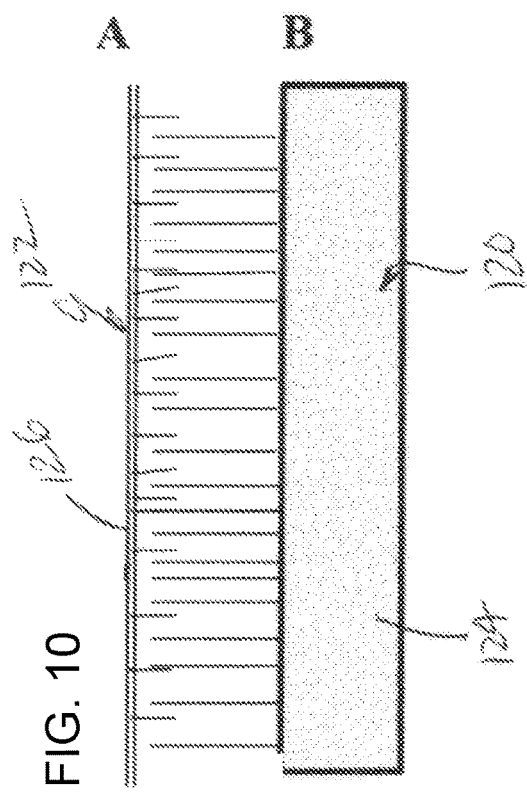

PANEL FOR ABSORBING MECHANICAL IMPACT ENERGY AND METHOD OF MANUFACTURING

RELATED APPLICATIONS

This application is a continuation of U.S. patent application Ser. No. 13/906,901 filed May 31, 2013 entitled PANEL FOR ABSORBING MECHANICAL IMPACT ENERGY AND METHOD OF MANUFACTURE, which claims priority to U.S. Provisional Application No. 61/644,056 filed on Jun. 1, 2012 entitled BREATHABLE FIBROUS MATERIAL FOR MANAGING MECHANICAL IMPACT ENERGY AND A METHOD FOR MAKING THE SAME.

FIELD OF THE INVENTION

The invention relates to energy absorption panels for cushioning mechanical impact loads.

BACKGROUND

The need for energy absorbing padding to cushion mechanical impact loads is present in many environments. For example, personal protection equipment such as helmets, shin guards and body part protectors typically include some form of cushioning layer. The type of helmet commonly used in football, for example, has a hard outer shell that generally is molded of impact resistant plastic such as acrylonitrile butadiene styrene (ABS) or polycarbonate. The interior of the helmet is lined with various components that may be formed, for example, from various materials such as felt, fibrous knits, foam-padding material such as ethylene vinyl acetate, vinyl nitrile or urethane/rubber. The liner is included in the design of the helmet and functions to provide some cushioning of direct physical impacts during active play.

Other environments where high impact forces are present are those involving body armor. For example, bulletproof vests typically are fabricated from polyaramid (Kevlar®), polyolefin fibers, woven or mat fabrics having high impact and cut resistance. When struck by a projectile, these vests and similar clothing can impress a direct force on the wearer's body area that, while potentially life-saving, can cause significant bodily bruising and/or a bone fracturing injury.

It is desirable in these and in other environments where impact forces are involved that the helmet or protective garment be comfortable and in some applications, that it has the ability to allow airflow between the user's body and the helmet or protective garment. It also would be desirable to provide a liner construction adapted for use in such environments that is flexible, can be formed in various shapes, displays an energy absorbing compression function, can be worn close to the body and may enable airflow between the body and the protective helmet or garment.

SUMMARY

The invention provides panel constructions that may be relatively thin, flexible and may be used as direct impact absorbing devices or may be used in conjunction with other devices, such as the cushioning materials commonly found in helmet padding and the like. In the context of this invention, the term panel refers to a flexible, planar member with a very small ratio of thickness to length and width. A panel, in accordance with the invention, includes a substrate to which a multiplicity of short fibers are attached, by one of their ends, with the other ends of the fibers extending away substantially perpendicular to the substrate. A porous protective covering layer of material may overlie the array of fibers to serve as a layer for the fibers. The protective covering layer may be attached to the substrate so that the fibers are wholly contained within the envelope. The fibers are arranged on the substrate at a fiber density (fibers per unit area) in close proximity to each other and are oriented in a direction generally perpendicular to the surface to which they are attached. The fibers are resilient so that they may deform under the influence of an impact load applied to the panel, yet return or spring back substantially to their pre-impact configuration. The collective effect of the multiplicity of fibers is to provide a cushioning and reduce the transmitted impact force by absorbing some of the applied impact load.

Although the fibers are arranged in close proximity, they nevertheless may be so arranged to have a low enough fiber density (number of fibers per unit area) to allow airflow between the substrate and the porous protective covering. Additionally, airflow holes may be formed, as by needle punching, in any covering for the panels and/or the substrate to facilitate breathability of the panel. Moreover, panels made in accordance with the invention may be constructed and arranged to be sufficiently flexible to conform to body contours and to internal contours of other protective devices, such as helmets, body armor vests and other body protection devices. The characteristics of the panel may be varied by selection from among a variety of materials for the substrate, covering, fiber characteristics, fiber dimensions, fiber spartial densities and fiber geometrical arrangements.

In other aspects of the invention, two or more panels may be stacked to provide multilayer arrangements with additional compressibility and varying characteristics. Among the variations of the invention panels may be formed to be double-sided, that is, to have a central support layer with fibers projecting outwardly from each side of the support layer. The double-sided panels may be stacked (1) with the fibrous surfaces of each individual panel being separated by a layer of a fabric separator sheet that prevents the facing fibrous layers of the panel assembly from becoming enmeshed with each other or (2) with no separating layer so that the fibers of one panel become enmeshed with the fibers of an adjacent panel. In yet another aspect of the invention the fibers of the panel are arranged so that when the panel is subjected to an impact load the fibers collapse resiliently and, in doing so, may frictionally engage each other to enhance the energy absorption capability of the panel.

In a further aspect of the invention the fibers attached to one surface of the support ply may include a mixture of two or more groups of fibers, including a group of longer, higher denier, relatively stiff, but resilient fibers and another group of shorter, lower denier fibers that are relatively soft and less resilient with the fibers of the groups being interspersed with each other.

In yet another aspect of the invention a method is provided for manufacturing panels having a mixture of two groups of fibers using a flocking process in which a support ply or substrate is coated, over its surface, with an uncured, fluid adhesive. A first group of a multiplicity of short, low denier fibers is electrostatically propelled against the fluid adhesive coated surface whereby the fibers become embedded, at one of their ends, in the fluid adhesive with the other ends of the fibers extending freely away from the support. Before the adhesive has cured a second group of a multiplicity of fibers of higher denier and greater length similarly is embedded in the adhesive using the previously described electrostatic flocking process. The adhesive then is caused or is permitted to cure to securely attach the fibers to the support.

DESCRIPTION OF THE DRAWINGS

The various aspects and advantages of the invention will be appreciated more fully from the following description of the invention in conjunction with the accompanying, not-to-scale, diagrammatic drawings in which:

FIG. 7 is a diagrammatic side view similar to FIG. 1A in which the support ply is formed to include a plurality of perforations to facilitate airflow through the panel;

FIG. 8 is diagrammatic side view similar to FIG. 7 in which the fibers are depicted as being longer than those of FIG. 7;

FIG. 9 is a diagrammatic illustration of an embodiment in which the fibers are applied directly to a polymeric foam substrate;

FIG. 10 is a diagrammatic illustration of an embodiment in which a pair of panels are disposed face to face with the fibers of each of the panels facing the support ply of the other of the panels and with the fibers of one panels being enmeshed with the fibers of the other panel;

DETAILED DESCRIPTION

Figure 1A:
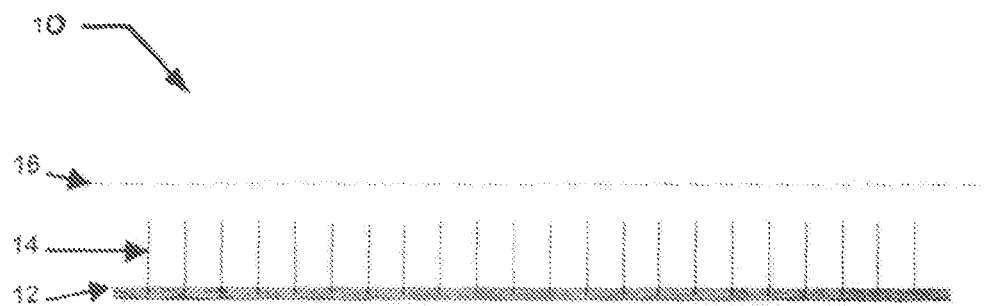
FIG. 1A is diagrammatic side view of a basic panel structure with the protective cover separated from the panel.
Figure 1B:
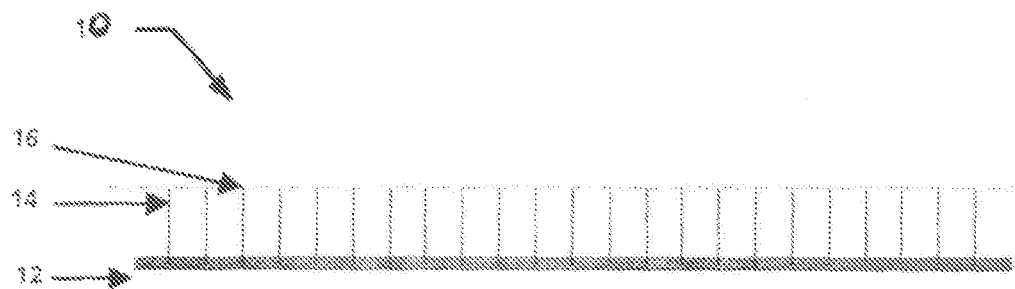
FIG. 1B is diagrammatic side view of the basic panel structure of FIG. 1A with the protective cover attached to the panel and covering the fibers.

A basic panel structure 10 of the invention is illustrated in FIGS. 1A and 1B and includes a substrate or support ply 12 having a multiplicity of fibers 14 attached, at one of their ends, to the support ply 12. For most applications the support ply 12 preferably should be selected to be flexible so that it may conform to a contoured surface with which it may be used and to which it may be applied. The degree of panel flexibility will be a function of the particular application. For example, a greater degree of flexibility for the support ply 12 may be desired when the panel is to be used in a body garment than in a protective helmet. By way of example only, the support ply may be formed from a variety of fabrics such as woven, knitted or nonwoven fabrics. In some applications the support ply may be formed from a layer of non-fabric material that may be more or less flexible than a fabric. In other applications a foam material could be used as the support ply. The support ply may be formed or cut to any peripheral shape to fit a particular application.

In the preferred method of practicing the invention, the fibers 14 are applied to the support ply 12 by a flocking process in which a surface of the support ply 12 is coated with a curable fluid adhesive and a by the electrostatic (flocking) process a multiplicity of fibers 14 are aligned in an electric field and propelled toward the electrically grounded uncured adhesive coated substrate such that the ends of the fibers become embedded in the adhesive with the fibers being oriented generally perpendicular to the support ply 12. Details of the flocking process involve the electrostatic alignment of specifically cut, short fibers, onto the fluid, uncured adhesive coated and electrostatically grounded fabric or flexible or rigid material substrate. This is accomplished by impinging the electrostatically charged and aligned, in the electric field, short fibers into the uncured adhesive on the electrically grounded surface and then subsequently curing or allowing curing of the adhesive, thus securing the electrostatically aligned fibers in place.

The flock density may be varied, in combination with the other parameters of the fibers and other components, to achieve the panel characteristics desired for the particular application. One can vary the flock density by controlling the number of fibers applied to the adhesive coating. Additionally, applying the adhesive in patterns on the substrate so that fibers will attach only in an array defined by the adhesive pattern also may be employed to vary flock density. For example the adhesive may be may be applied in a dot pattern, square pattern, striped pattern or any other desired pattern.

To keep the fibers collectively together and to prevent the fibers from microscopically penetrating into an object to be protected, a contiguous layer 16 of a thin, flexible fabric or perforated plastic sheet (such as polyester film or Mylar) is applied over the fibers to envelop them. The layer 16 is secured to the substrate 12 as by sewing, adhesive bonding, or overall discrete adhesive coating or other suitable attachment methods.

The fibers 14 may be comprised of synthetic polymeric fibers of the type commonly used in textile or flocking industries, such as, for example, nylon or polyethylene terephthalate (PET), although the characteristics of the fibers should be selected so that they will have sufficient stiffness while providing a desired degree of resilience. By way of example, nylon 66 fibers or other fiber materials having sufficient modulus of elasticity, when combined with the denier and length, to provide the desired resilience and cushioning may be employed. The fibers should be of relatively high denier, for example, in the range of about ten to about 60 denier and preferably in the range of about 20 to 45 denier and may have a length, preferably in the range of about two (2) to about six (6) mm such that the combined characteristics of the fibers 14 result in a sufficiently stiff fiber that may present a degree of springiness or resistance of an order of magnitude sufficient to absorb impact energy from a mechanical compression load that can be anticipated for the particular application. In a preferred embodiment the flock fibers should be applied to the substrate surface such that their coverage will have a fiber density ("flock density") in the range of between about 50 to about 600 fibers/sq. mm.

Figure 2:
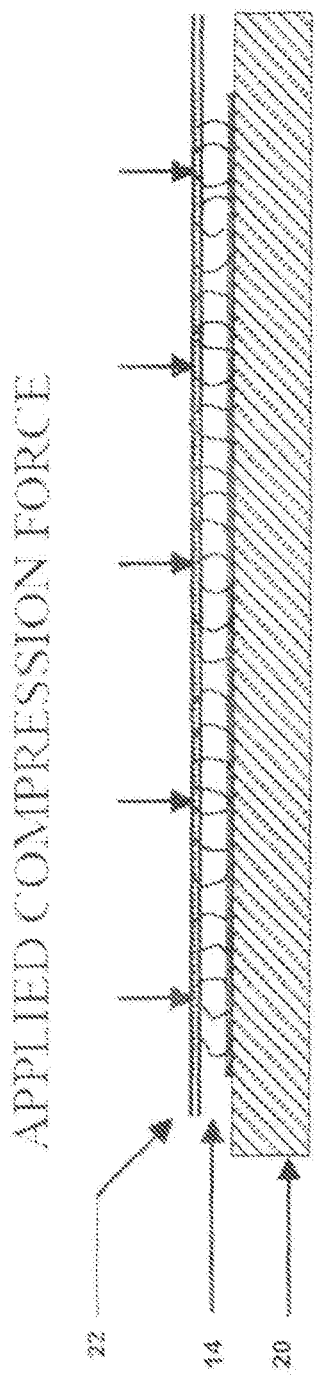
FIG. 2 is a diagrammatic side view of the panel of FIG. 1B under compression.
Figure 3:
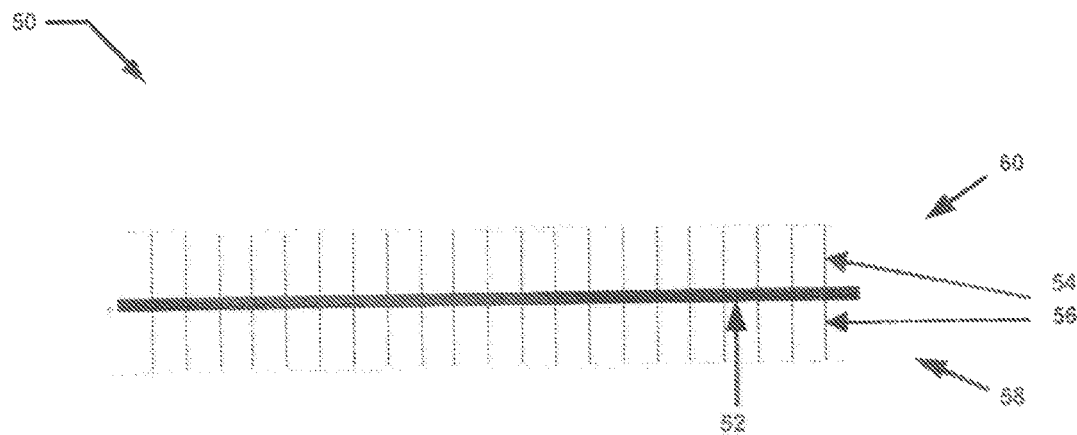
FIG. 3 is a diagrammatic side view of a double-sided panel.

FIG. 2 illustrates the behavior of the spring-like flock fibers 14 when a compression force is applied to a panel. FIG. 3 depicts the panel 22 disposed on a base 20 and having compression force applied. FIG. 2 demonstrates, diagrammatically, the manner in which the fibers bend, buckle, or otherwise deform, resiliently, under the influence of a mechanical impact load. The energy absorbing function of the panel is due in part to the spring action of the device as it absorbs energy. In addition to the spring action, the flock fibers are in proximity to each other and, as they deform, may generate an inter-fiber friction force as the fibers rub against each other dynamically during compressive impact deformation.

FIG. 3 illustrates another embodiment of an energy-absorbing panel 50 in which fibers 54, 56 are attached to both sides of a central support ply 52, respectively. As with the previously described embodiment, to keep the flock surface arrangement collectively together and to prevent the flock fibers from microscopically penetrating into the object being protected, a contiguous layer of a thin flexible fabric or perforated plastic sheet 60 is applied to envelop the flocked panels. The sheet 60 is secured to the central support ply 52. The sheet or fabric 60 may be perforated, as by needle punching, to facilitate airflow through the panel. The central support ply also may be perforated for the same purpose. It should be noted that in the previously described embodiments as well as in this and other embodiments the fibers, although positioned close to each other, nevertheless they may provide sufficient open space to permit airflow through the panel. The ability for the panel to "breathe" may enhance the comfort to the user.

Figure 4:
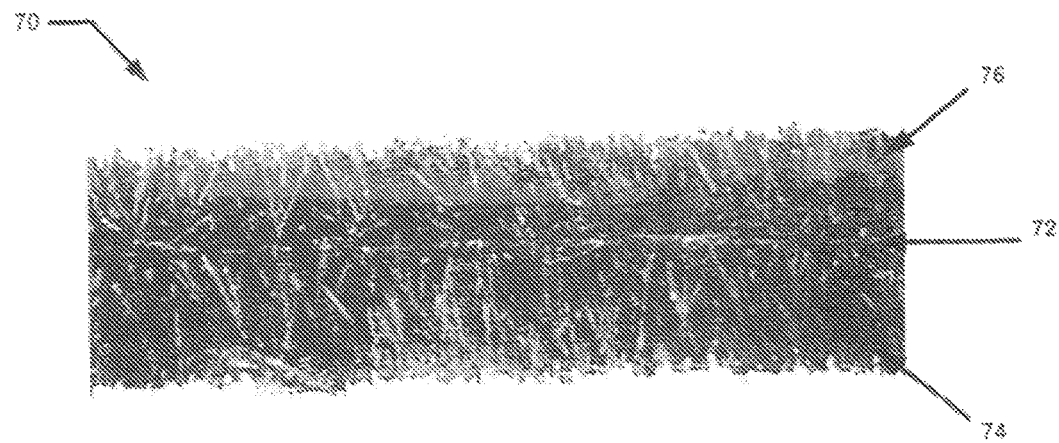
FIG. 4 is a side view photograph of a double-sided panel of the type diagrammed in FIG. 3.

FIG. 4 is a magnified photograph of the double-sided panel shown diagrammatically in FIG. 3. The double-sided panel 60 includes the central support ply 72, a first plurality of fibers 74 attached to the central support ply and a second plurality of fibers attached to the other face of the central support ply.

Figure 5A:
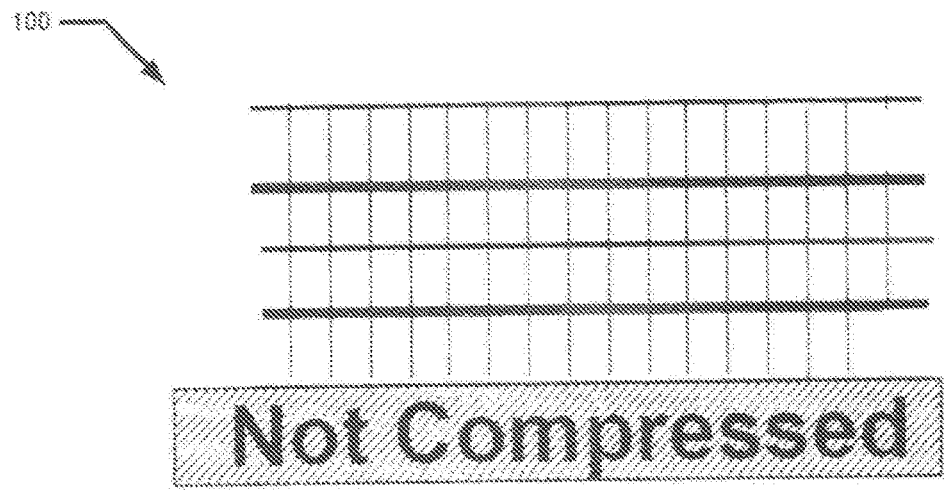
FIG. 5A is a diagrammatic side view of a panel construction of two panels with a separator fabric between the two panels before compression.
Figure 5B:
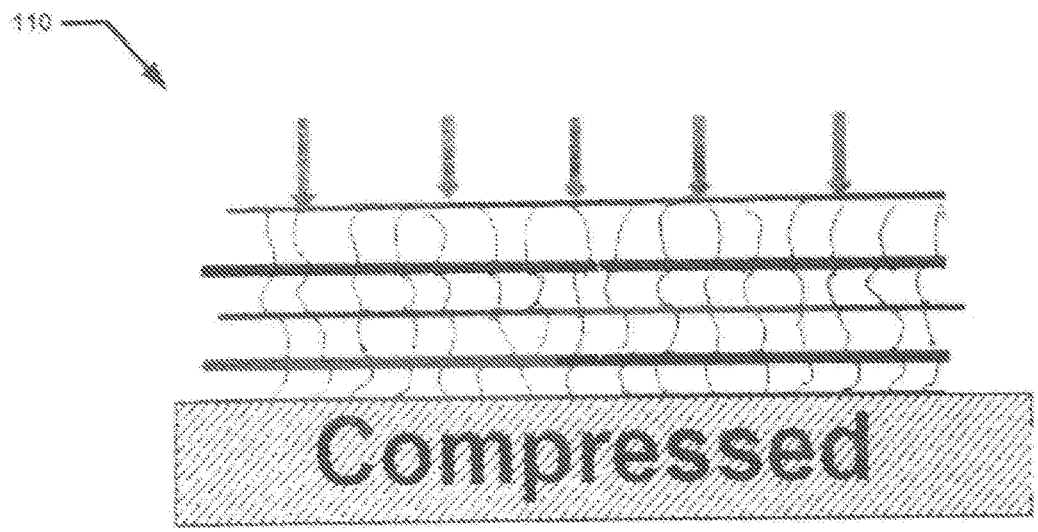
FIG. 5B Is a diagrammatic side view of the multilayer panel construction of FIG. 5A during compression.

FIGS. 5A and 5B are diagrammatic representations of an assembly of two panels not compressed (100) and compressed (110), respectively. The comparison of FIGS. 5A and 5B demonstrates the manner in which the flock fibers bend, twist or curl under a compressive load.

Figure 6A:
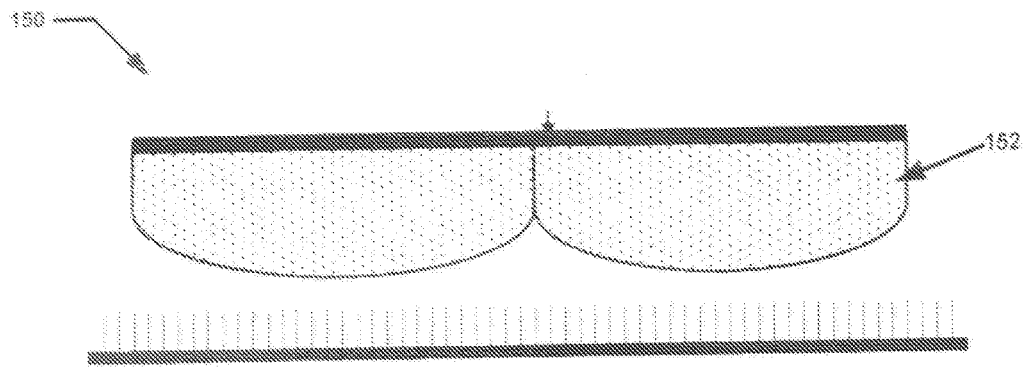
FIG. 6A is a diagrammatic side view of a panel before compression by an irregularly shaped object.
Figure 6B:
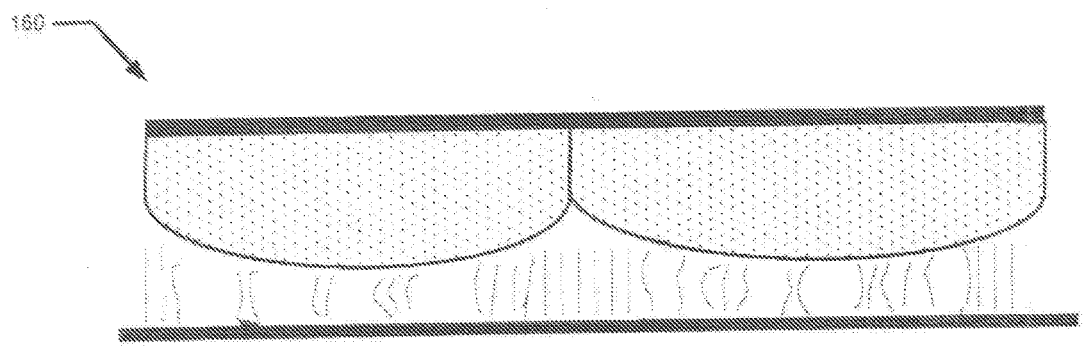
FIG. 6B is a diagrammatic side view of the panel of FIG. 6A during the compression by an irregularly shaped object.

FIGS. 6A and 6B demonstrate, diagrammatically, the ability of a panel in accordance with the invention to respond to a compressive force from an uneven, compound hard surface 152. When the compound-shaped surface 152, engages the panel, the fibers in the convex zones of the surface bend, buckle, crush and conform to the shape of the convex surface. The compression force is conformably variably distributed. The flock fibers facing the convex zones of the surface 152 are less deformed in those regions that are engaged by a concave or creviced portion of the surface. Thus the degree to which the fibers may buckle is dependent on the contour or shape of the object that imposes the impact load as well as the contour of the object or body part being impact protected by the panel. The energy is distributed along with the panel according to the shape of the impacting surface. When the load is removed, the spring-like characteristic of the fibers causes the panel to revert or re-bound toward its pre-impact configuration.

In each of the panels, the degree of breathability depends on the flock density (fibers per unit area) of the panel and/or the porosity of one or both of the support ply 12 and the covering layer 16. The support ply 112 of a panel as well as the cover (not shown in FIG. 7 or 8) of a panel can be needle-punched, as suggested diagrammatically in FIGS. 7 and 8, to form a plurality of small airflow holes 19 that communicate with the fiber-containing space. Such needle punching also may increase the flexibility of the panels as may be desirable with impact garment liners (for example, sports clothing and armor shielding or bullet-proof vests, shoe insoles etc.).

Panels made in accordance with the invention may be used in conjunction with other shock absorbing members, for example, by attaching one or more panels to a surface of a foam pad that either faces the user or faces away from the user. In another embodiment, the fibers may be attached directly to a surface of a foam pad 114, as suggested in FIG. 9. The foam may comprise any of the materials used for protective padding such as, for example, polyurethane memory foam, ethylene vinyl acetate (EVA) foam, nitrile rubber foam, etc. Here, the foam layer may serve as the substrate or supporting surface that may be coated with adhesive with the fibers then being attached as described above. The fibers of the composite foam-fiber panel preferably are covered with a thin, flexible fabric covering the ply presenting a comfortable surface, for example, terrycloth, micro-suede, flannel, etc.

FIG. 10 illustrates another embodiment of the invention in which two panels 120, 122 are brought together with their flocked surfaces facing each other such that the fibers of each of the panels face the supporting substrate of the other of the panels. In this arrangement the opposed fibers of the panels will become enmeshed with each other when the panels are brought together (i.e., the fibers of one panel will extend in between and in engagement with the fibers of the other panel). The characteristics of the fibers (denier, lengths, flock densities should be selected so that when the enmeshed fibers are subjected to an impact load the fibers of each panel will buckle as described above and, in doing so, will frictionally engage and interfere with each other to enhance the impact absorption capacity of the device. As with all other embodiments of the invention, the fiber material, denier, lengths may be selected to result in an impact absorber having the desired characteristics. Flock fibers of non-uniform length may be used in a panel and flock densities may be varied and placement and size of perforations maybe varied. It should be understood that although FIG. 10 illustrates one panel as having a foam substrate 124 and another panel having a thin substrate 126, the type and dimensions of the substrates may be varied depending on the particular application in which the invention is to be employed. It may be noted that although the fiber lengths in one of the panels 122 are shorter and thinner than the lengths and thickness of the fibers in the other panel 120, the fiber lengths for the panels may be the same or may be varied, again, depending on the desired energy absorption characteristics and application in which the invention is to be used.

Figure 11:
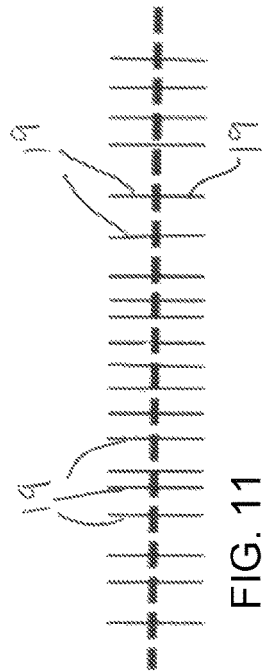
FIG. 11 is a diagrammatic illustration similar to FIG. 3 in which the central support ply is provided with a plurality of perforations to facilitate airflow through the panel.
Figure 12:
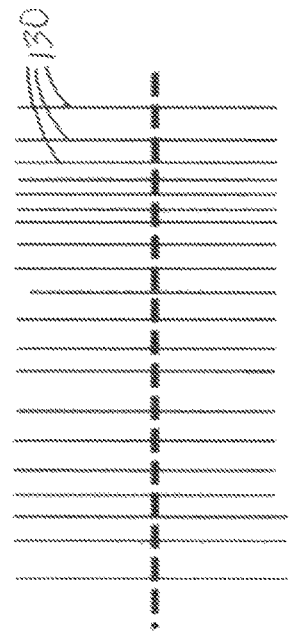
FIG. 12 is a diagrammatic illustration similar to FIG. 11 in which the fibers are longer than those depicted in FIG. 11.
Figure 13:
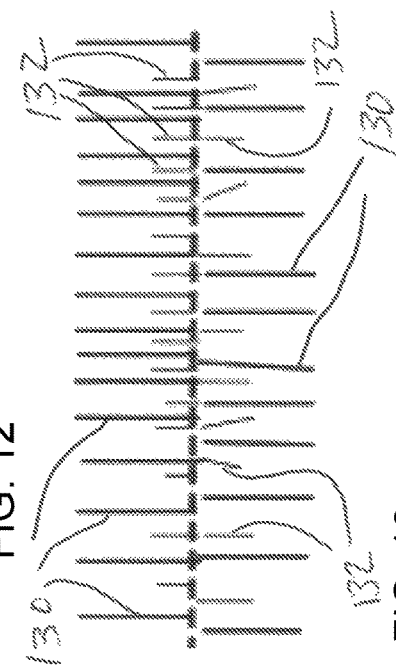
FIG. 13 is a diagrammatic illustration of a double-sided embodiment of the invention in which fibers having different characteristics of length and denier are attached to the central support ply.

Another variation that may be employed in configurations such as FIG. 10 is that the covering panel may have a substrate 126 may be formed from a material or fabric that, although having fibers attached to an inwardly facing surface, presents an externally facing surface that is soft and comfortable to the skin such as micro-suede. Terrycloth or other material with a napped or soft velvet-like feel. FIG. 11 illustrates the type of double-sided panel construction shown in FIGS. 3 and 4 in which the central support layer is provided with perforations 19 to facilitate the breathability of the panel. FIG. 12 depicts an arrangement similar to FIG. 11 except that the fibers are greater in length. As described above, panels such as those depicted in FIGS. 11 and 12 preferably will be covered by an outer, porous flexible ply that also may be so configured to include airflow perforations FIG. 13 illustrates, diagrammatically, an embodiment of a panel in which two different fiber lengths and deniers are projecting from a surface of a support ply. In this embodiment a number of the fibers 130 extending from each face of the central support ply are of a heavier denier and are longer than other of the fibers 132 that are of lesser denier and are shorter. It is believed that although the relatively soft, lower denier, shorter fibers would, by themselves, present relatively low energy absorption characteristics, when combined with the higher denier, longer fibers, their combination presents greater energy absorption capability than either alone. As mentioned above, this is believed to result from frictional interaction between the shorter/softer and longer/stiffer fibers. Preferably the higher denier fibers may be approximately twice the length of the lower denier fibers. Although in the example discussed, the shorter fibers were of the order 0.028 inches long, three denier, and the longer fibers were approximately 0.060 inches long and 45 denier, it should be understood that the fiber arrangement may differ from this example by varying the lengths and deniers, FIG. 13 being merely for illustrative purposes.

In some applications it may be desirable to mix fibers having different lengths and deniers. For example, we have fabricated a composite of three double-sided panels, each individual panel is about four mm thick (total stacked thickness 12 mm) having a mixture of short, soft nylon 66 fibers, 3.0 denier, 0.028" in length and long, stiffer fibers, 45 denier, 0.060" long nylon fibers with the total assembly having an areal density of about 1.4 Kilograms/square meter. The construction of these individual panels is illustrated, diagrammatically in FIG. 13. They were fabricated by first coating one side of the central support ply with adhesive and then applying under an electrostatic field the shorter, softer fibers to the adhesive surface as described above. Then, before the adhesive layer containing these shorter softer flexible fibers was cured, the longer, stiffer fibers were then applied under the influence of an electrostatic field, and were embedded in the adhesive, interspersed between the shorter, softer flexible fibers. The process then was repeated on the other side of the central support ply, resulting in a double-sided panel. The panels were stacked, with a thin flexible polyester woven separator fabric placed between adjacent panels to prevent the facing fibers of adjacent panels to extend into and mesh with each other. A thin, flexible micro-suede surfaced polyester fabric to retain the panels together then was placed about the stack of three panels to envelop the stack. We found this arrangement of stacked panels to absorb energy in a ball drop test comparable to a commercially available polyurethane memory foam (Poron® XRD, 9.5 mm thick) used in equipment such as helmets and the like. In this comparison, Poron® XRD memory foam had an areal density of 1.8 Kilograms per square meter. While the Poron® foam and the panels described above had the same ball-drop test energy absorption performance the panel was over 20% lighter in weight than the foam. Therefore, the energy absorbing panel material should have an important weight advantage over certain foam materials in various applications. The areal density of an energy absorbing material is an important consideration for sport and military wear. It is believed that as the longer, springier and resilient fibers buckle and deform under the influence of an impact load, they will internally engage, frictionally, with each other and with the shorter, lower denier fibers to contribute to the ability of the panel to absorb some of the impact energy.

Figure 14:
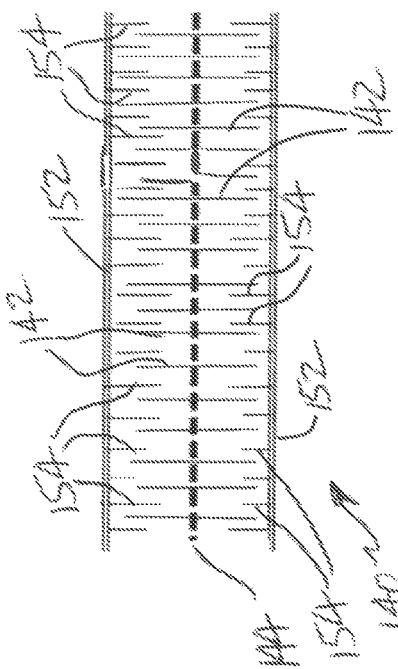
FIG. 14 is a diagrammatic illustration of a three-panel embodiment of the invention including an inner, double-sided panel and a pair of outer panels arranged with their fibers extending inwardly toward the central support ply of the inner panel and with the fibers of the outer panels being enmeshed with the fibers of the inner panel.

FIG. 14 illustrates another embodiment that incorporates three panels including a double-sided inner panel 140 having fibers 142 extending from each surface of a central support ply 144 and a pair of outer panels 150 each comprising a support ply 152 and a plurality of fibers 154 extending inwardly toward the central support ply 144 of the inner panel 140 and enmeshed with the fibers 142 of the inner panel 140. When the device is subjected to a mechanical impact load the panels will be compressed causing the fibers to resiliently buckle and deform with the fibers of the panels frictionally engaging with each other as described above. In this embodiment the three-panel assembly may be enclosed in an envelope, as of a thin polyester fabric, micro-suede, pile fabric or a velvet-like fabric. Alternatively, in this case, the outer supporting substrate material 152 could itself be fabricated from soft fabrics where the outer side of the enveloping fabric is the soft-to-the-feel surface and the inwardly facing side of the substrate 152 has the inward-projecting flock fibers 154. In other embodiments, one or both of the support plies of the outer panels may be formed from various materials, depending on the application, such as a flocked foam material.

Figure 15:
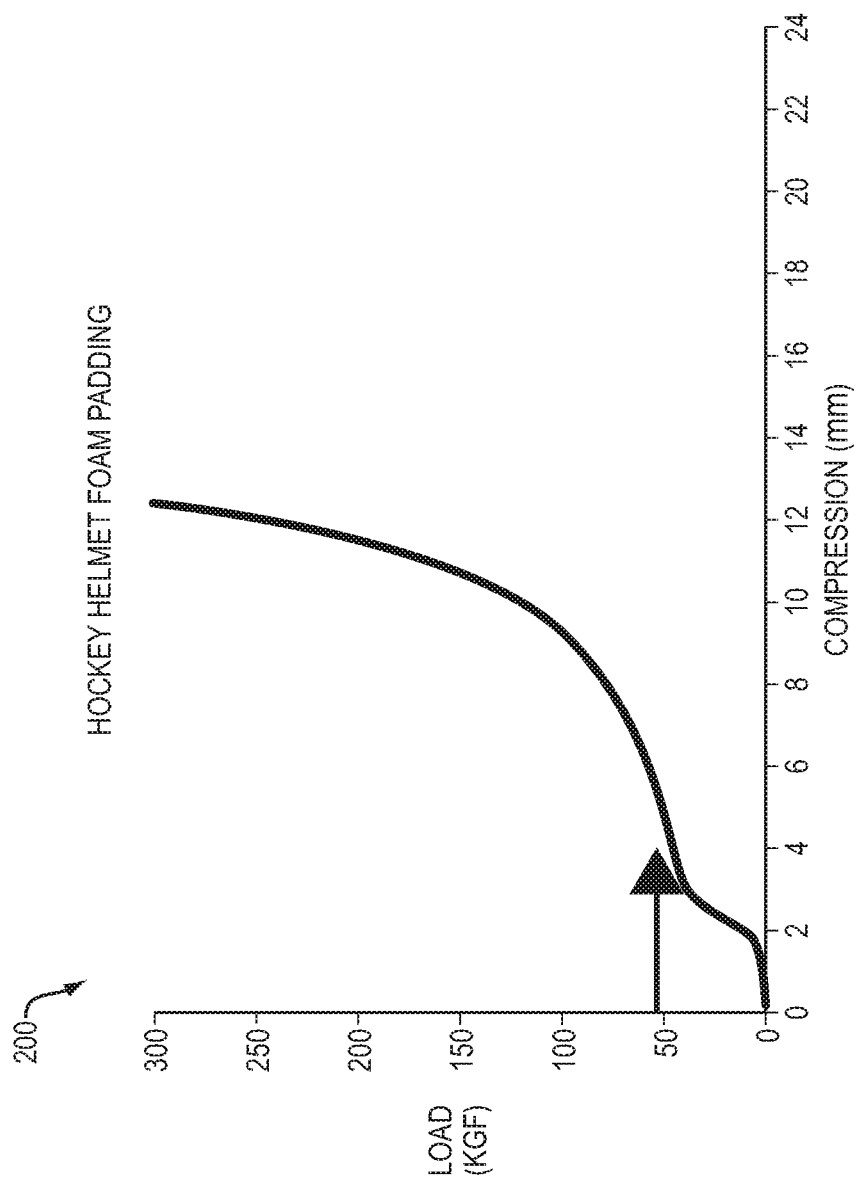
FIG. 15 is a graph showing compression versus load for rate conventional foam padding material as used in a hockey helmet.
Figure 16:
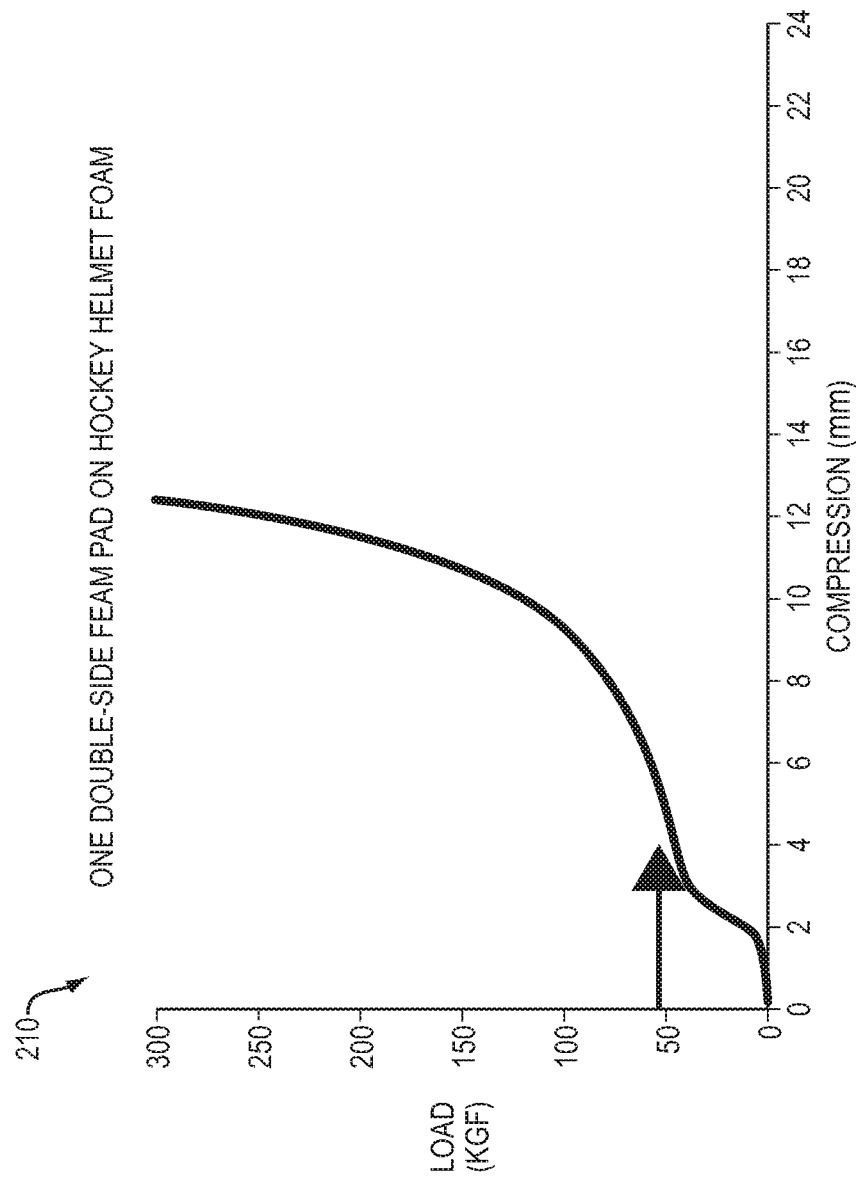
FIG. 16 is a graph showing compression versus load for a combined layered structure of the hockey helmet foam pad and a double-sided panel of FIGS. 3 and 4.
Figure 16:
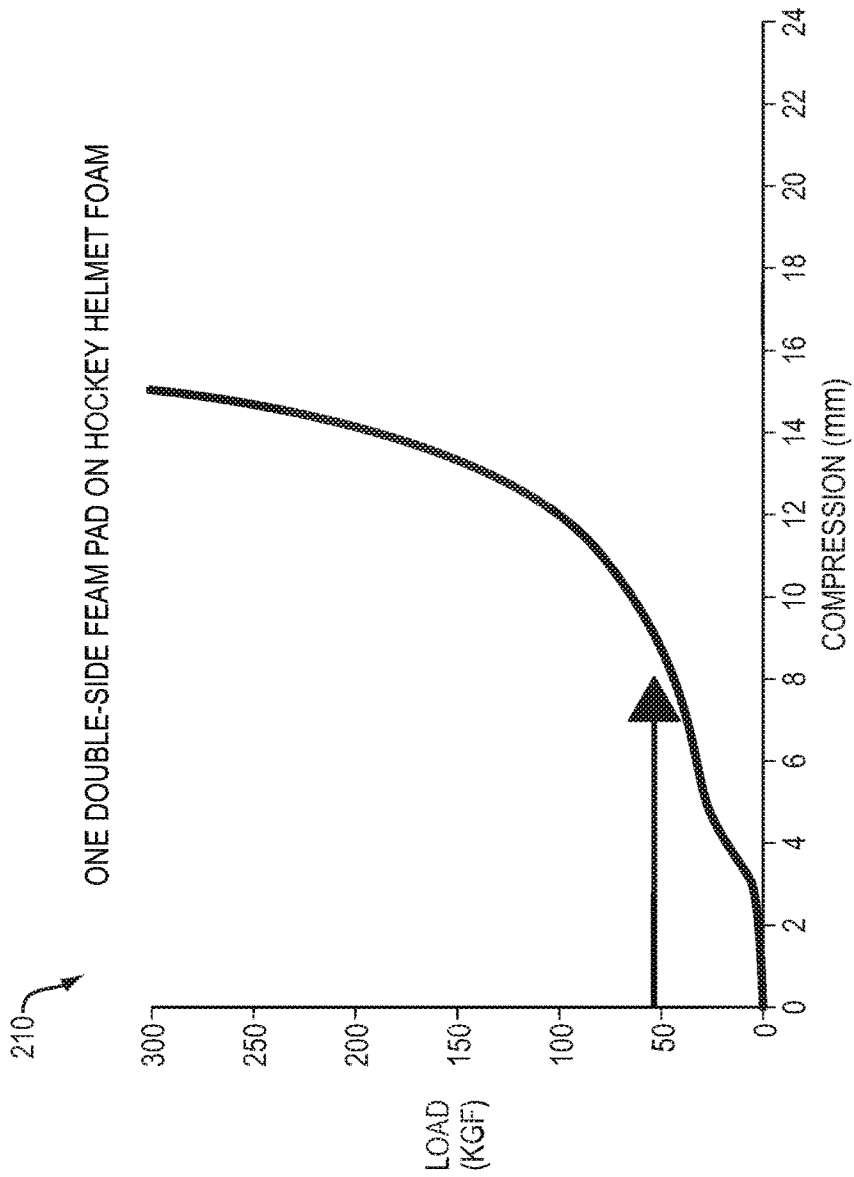

FIG. 15 is a graph 200 illustrating the force of an initial impact shock for foam padding of the type used in a conventional hockey helmet. The graph plots the load, in KGF versus the compressional strain of the material in millimeters. As is apparent from the curve, there is a sharp knee in the curve at about 40 KG have and the current increases exponentially thereafter. At a 50 KGF compressive load, 4 mm compression in the material was observed. FIG. 16 shows a similar graph to FIG. 15 for the same hockey helmet foam material to which a double-sided pad, such as that shown in FIGS. 3 and 4, was layered against the hockey helmet foam of FIG. 15. FIG. 16 demonstrates that the knee of the curve is significantly less pronounced which illustrates how the panel of the invention blunts and effectively cushions the initial shock that a hockey helmet wearer would receive if the wearer's helmet were outfitted with supplemental panels in accordance with the present invention. In this arrangement, approximately 8 mm of compression is observed at a compression force level of 50 KGF, signifying a more gentle impact absorption obtained with the invention.

From the foregoing it will be appreciated that the invention provides a new type of energy absorbing padding material described as panels and panel configurations and constructions adapted to cushion or blunt mechanical impact loads. Depending on the application, panels in accordance with the invention may be used by themselves as a primary protective element or in conjunction with other energy absorbing devices. The panels may be used individually or in combination with other energy absorbing layered materials to achieve the desired energy absorption properties. The panels may be of lightweight, non-bulky construction suitable for use in protective garments or sports equipment. The panels are lightweight and are easily manufactured at low cost. In addition to the impact absorbing features of the invention, the panels can breathe and enhance user comfort. The principles of the invention may be incorporated in various combinations of support ply configurations. The energy absorbing fibers serve as tiny spring-like spacer elements. In order to enhance the frictional characteristics of the fibers they may be treated with a friction-enhancing sizing. The invention may be practiced in a single or multilayer sandwich configuration with the fibers separating the plies and covering the elements of the sandwich.

It should be understood, however, that the foregoing description of the invention is intended to be merely illustrative thereof and that other embodiments, modifications and equivalents may be apparent to those skilled in the art without departing from the principles of the invention.

We claim:

1. A panel for absorbing energy from an impact load comprising:
    a substrate;
    a multiplicity of flocked monofilament flock fibers, each having first and second ends, the fibers being attached, at their first ends to a surface of the substrate with the second ends of the multiplicity of monofilament flock fibers extending away from the substrate;
    the multiplicity of monofilament flock fibers extending away substantially perpendicular to the substrate;
    the multiplicity of monofilament flock fibers being closely spaced to each other sufficiently to buckle resiliently and absorb a portion of the energy imparted to the panel by an impact load;
    wherein the multiplicity of monofilament flock fibers further comprises:
    a first group of fibers, each fiber having a first denier and a first fiber length and a second group of fibers, each fiber of the second group of fibers having a second denier lower than the first denier and a second length shorter than the first length; and
    wherein the second group of fibers are interspersed among the first group of fibers.

2. The panel as defined in claim 1 further comprising a flexible protective cover attached to the substrate and overlying the multiplicity of monofilament fibers.

3. The panel as defined in claim 2 wherein the protective cover is unsecured from the free second ends of the multiplicity of monofilament flock fibers.

4. The panel as defined in claim 2 wherein the protective cover is secured to the free second ends of the multiplicity of monofilament flock fibers.

5. The panel as defined in claim 2 wherein the protective cover is porous to enable airflow through the protective cover.

6. The panel as defined in claim 1 wherein the first group of fibers are between about 2 mm to about 6 mm in length; and
    wherein the first group of fibers have a denier in the range of about 10 to about 60.

7. The panel as defined in claim 6 wherein the flock density of the multiplicity of monofilament flock fibers is in the range of about 50 to 600 fibers per square millimeter.

8. The panel as defined in claim 1 wherein the flock density of the multiplicity of monofilament flock fibers is in the range of about 50 to 600 fibers per square millimeter.

9. The panel as defined in claim 1 wherein the first group of fibers have a first denier of between about 10 and 60 and a first length of between about 2 mm to about 6 mm; and wherein the second group of fibers have a second denier between about 1.5 to about 9 and a second length of between about 0.5 mm to about 2.0 mm.

10. The panel as defined in claim 9 wherein the second group of fibers have a second denier of about 3.0 and a second length of about 0.028 inches and the fibers in the first group have a first denier of about 45 and a first length of about 0.060 inches.

11. The panel as defined in claim 1 wherein the panel is sufficiently flexible to conform or bend to varying contours.

12. The panel as defined in claim 1 wherein the spacing between the multiplicity of monofilament flock fibers enables air to flow between the substrate and the thin flexible, porous, fabric, protective cover.

13. The panel as defined in claim 12 further comprising at least one of the substrate and the thin flexible, porous, fabric, protective cover being porous to permit airflow therethrough.

14. The panel as defined in claim 1 wherein the multiplicity of monofilament fibers are flocked onto the substrate in a flock density so that they frictionally engage adjacent ones of the multiplicity of monofilament fibers when deforming in response to an applied impact load wherein the frictional engagement increases the ability of the panel to absorb a portion of an impact force.

15. The panel as defined in claim 1 wherein the substrate is formed from material adapted to absorb impact energy from an external impact force.

16. The panel as defined in claim 15 wherein the substrate comprises compressible foam.

17. The panel as defined in claim 1 further comprising:
    a second multiplicity of flocked monofilament fibers each having first and second ends, the fibers being attached, at their first ends to a second surface of the substrate opposite the surface of the substrate, with the second ends of the fibers extending away from the substrate;
    the second multiplicity of flocked monofilament fibers being of a denier and length and being closely spaced to each other sufficiently to buckle resiliently and absorb a portion of the energy imparted to the panel by an impact load.

18. The panel as defined in claim 17 further comprising:
    a porous protective cover enveloping the first and second multiplicity of fibers.

19. The panel as defined in claim 18 further comprising:
    a plurality of airflow holes formed by needle punching the panel including the attached multiplicity and attached second multiplicity of fibers.

20. The panel as defined in claim 1 wherein the interspersed monofilament flock fibers of the first group of fibers will frictionally engage adjacent ones of the second group of fibers when deforming in response to an applied impact load providing a greater energy absorption capability than either group of fibers alone.

* * * * *

UNITED STATES PATENT AND TRADEMARK OFFICE
CERTIFICATE OF CORRECTION

PATENT NO. : 10,245,807 B2
APPLICATION NO. : 15/252645
DATED : April 2, 2019
INVENTOR(S) : Armand F. Lewis and Yong K. Kim Page 1 of 2

It is certified that error appears in the above-identified patent and that said Letters Patent is hereby corrected as shown below:

In the Drawings

Replace FIG. 16 with the attached FIG. 16.

Signed and Sealed this
Twenty-eighth Day of May, 2019

Andrei Iancu
*Director of the United States Patent and Trademark Office*